(12) United States Patent
Noh et al.

(10) Patent No.: US 11,983,843 B2
(45) Date of Patent: May 14, 2024

(54) METHOD FOR SYNTHESIZING IMAGE

(71) Applicant: Defense Agency for Technology and Quality, Gyeongsangnam-do (KR)

(72) Inventors: Sang Woo Noh, Gyeongsangnam-do (KR); Tae Hwan Kim, Gyeongsangnam-do (KR); Jin Woo Ahn, Gyeongsangnam-do (KR); Han Gyu Kim, Seoul (KR)

(73) Assignee: Defense Agency for Technology and Quality, Gyeongsangnam-do (KR)

( * ) Notice: Subject to any disclaimer, the term of this patent is extended or adjusted under 35 U.S.C. 154(b) by 332 days.

(21) Appl. No.: 17/549,944

(22) Filed: Dec. 14, 2021

(65) Prior Publication Data
US 2022/0188972 A1 Jun. 16, 2022

(30) Foreign Application Priority Data
Dec. 14, 2020 (KR) .................. 10-2020-0174471

(51) Int. Cl.
*G06K 9/00* (2022.01)
*G06N 3/045* (2023.01)
(Continued)

(52) U.S. Cl.
CPC .......... *G06T 3/4007* (2013.01); *G06N 3/045* (2023.01); *G06N 3/08* (2013.01); *G06T 3/4046* (2013.01); *G06T 5/50* (2013.01)

(58) Field of Classification Search
CPC .................................................. G06N 3/084
See application file for complete search history.

(56) References Cited

U.S. PATENT DOCUMENTS 7,965,875 B2 * 6/2011 Lonita ............... G06F 18/00
382/118
9,436,895 B1 * 9/2016 Jones ................. G06N 3/045
(Continued)

FOREIGN PATENT DOCUMENTS

| CN | 110532871 | 12/2019 |
| KR | 10-2020-0067631 | 6/2020 |
| KR | 10-2020-0126881 | 11/2020 |

OTHER PUBLICATIONS

Ground of Reasons of Rejection dated Apr. 10, 2021 From the Korean Intellectual Property Office Re. Application No. 10-2020-0174471. (3 Pages).
(Continued)

*Primary Examiner* — Hadi Akhavannik

(57) ABSTRACT

The present application relates to a method for synthesizing image and an image synthesizing apparatus using the same. The image synthesizing method of the present application and the image synthesizing apparatus using the same can reduce the time required for learning by reducing the distortion phenomenon of the algorithm and reducing the amount of calculation required for image synthesis. In addition, the image synthesizing method of the present application and the image synthesizing apparatus using the same can be utilized in various fields such as national defense, IT, and entertainment based on characteristics such as excellent performance and learning time reduction of deep learning algorithms, and can be utilized in psychological warfare or induction of command system confusion.

7 Claims, 3 Drawing Sheets

(51) Int. Cl.
    *G06N 3/08*     (2023.01)
    *G06T 3/4007*     (2024.01)
    *G06T 3/4046*     (2024.01)
    *G06T 5/50*     (2006.01)

(56) References Cited

U.S. PATENT DOCUMENTS

| | | | | |
|---|---|---|---|---|
| 9,578,345 | B2* | 2/2017 | DeForest | H04N 19/20 |
| 9,607,359 | B2* | 3/2017 | Takahashi | G06T 5/20 |
| 10,242,665 | B1* | 3/2019 | Abeloe | G06N 3/047 |
| 10,254,760 | B1* | 4/2019 | Abeloe | G06N 3/084 |
| 10,627,820 | B1* | 4/2020 | Abeloe | G05D 1/0221 |
| 10,783,622 | B2* | 9/2020 | Wang | G06T 5/002 |
| 10,802,488 | B1* | 10/2020 | Abeloe | B60W 30/0956 |
| 11,055,828 | B2* | 7/2021 | Long | G06V 20/40 |
| 11,122,238 | B1* | 9/2021 | van Amersfoort | G06N 3/08 |
| 2010/0008424 | A1* | 1/2010 | Pace | H04N 19/433 |
| | | | | 375/E7.125 |
| 2010/0315522 | A1* | 12/2010 | Tsurumi | H04N 5/144 |
| | | | | 348/222.1 |
| 2011/0142330 | A1* | 6/2011 | Min | G06T 3/4046 |
| | | | | 382/159 |
| 2011/0305384 | A1* | 12/2011 | Aoyama | G10L 25/78 |
| | | | | 382/159 |
| 2014/0092274 | A1* | 4/2014 | Tsurumi | H04N 23/00 |
| | | | | 348/222.1 |
| 2018/0075581 | A1* | 3/2018 | Shi | G06N 3/045 |
| 2019/0130530 | A1* | 5/2019 | Schroers | G06T 3/4007 |
| 2019/0215549 | A1* | 7/2019 | Han | G06V 20/41 |
| 2019/0286073 | A1* | 9/2019 | Hosseini-Asl | G06N 3/088 |
| 2019/0295302 | A1* | 9/2019 | Fu | G06V 10/82 |
| 2021/0073563 | A1* | 3/2021 | Karianakis | G06V 20/41 |
| 2021/0374904 | A1* | 12/2021 | Liao | G06T 7/73 |

OTHER PUBLICATIONS

Notice of Allowance dated 03 May1 2021 From the Korean Intellectual Property Office Re. Application No. 10-2020-0174471. (5 Pages).

Notice of Reasons for Rejection dated Dec. 13, 2022 From the Japan Patent Office Re. Application No. 2021-202734. (2 Pages).

Bansal et al. "Recycle-GAN: Unsupervised Video Retargeting", Proceedings of the 15th European Conference in Computer Vision, ECCV 2018, Munich, Germany, Sep. 8-14, 2018, Part V: 122-138, Sep. 8, 2018.

Siarohin et al. "Animating Arbitrary Objects Via Deep Motion Transfer", 2019 IEEE/CVF Conference on Computer Vision and Pattern Recognition (CVPR), Long Beach, CA, USA, Jun. 15-20, 2019, p. 2377-2386, Jun. 15, 2019.

* cited by examiner

[Figure 1]

[Figure 2]
$X_{t+1}$

[Figure 3]
$X'_t$

METHOD FOR SYNTHESIZING IMAGE

RELATED APPLICATION

This application claims the benefit of priority of Korea Patent Application No. 10-2020-0174471 filed on Dec. 14, 2020, the contents of which are incorporated herein by reference in their entirety.

FIELD AND BACKGROUND OF THE INVENTION

The present application relates to a method for synthesizing image and an image synthesizing apparatus using the same.

As a conventional image synthesis method, a recycle-generative adversarial network (recycle-GAN) algorithm that learns by combining a recurrent loss, a recycle loss and an adversarial loss was used. An extrapolation method was used in order to calculate the recurrent loss and the recycle loss. Due to the utilization of the extrapolation method, recurrent loss and recycle loss models have become future prediction models, and in order that images of a specific t time point frame of a first image or a second image may be naturally continued so as to be continuous with the flow of time, the images up to t−1 time point have been utilized and linked.

However, by using the extrapolation method when synthesizing two images in the recycle-generative adversarial network algorithm, it was confirmed that distortion of the algorithm was severe. Therefore, in order to solve this problem, there is a need for an image synthesis method capable of reducing distortion without using the extrapolation method when calculating the recurrent loss and the recycle loss.

SUMMARY OF THE INVENTION

It is a problem of the present application to provide an image synthesizing method capable of reducing the time required for learning by reducing a distortion phenomenon of an algorithm and reducing the amount of calculation required for image synthesis, and an image synthesizing apparatus using the same.

In order to solve the above problem, the image synthesis method of the present application comprises a step of preparing a first image and a second image different from the first image, and inputting temporal information and spatial information for each image; and a step of calculating a recurrent loss (LT) calculated by the following general formula 1 and a recycle loss (Lr) calculated by the following general formula 2 based on the input information, and learning by combining the calculated recurrent loss and recycle loss with an adversarial loss.

$$L_T(P_x) = \Sigma_{T-1} \| 2_{x_t} - P_X(x_{t+1}) - P_X(x_{t-1}) \|^2 \quad \text{[General Formula 1]}$$

$$L_r(G_X, G_Y, P_Y) = \Sigma_{T-1} \| 2_{x_t} - G_X(P_Y(G_Y(x_{t+1}))) - G_X(P_Y(G_Y(x_{t-1}))) \|^2 \quad \text{[General Formula 2]}$$

In General Formulas 1 and 2 above, $x_{t-1}$ is a previous time point frame of a specific t time point frame of the first image, $x_{t+1}$ is a later time point frame of a specific t time point frame of the first image, $x_t$ is a specific t time point frame of the first image, P is a prediction function trained to predict a future model from past frames of an image, G is an image generation function, X is the data of the first image, and Y is the data of the second image.

Also, the recurrent loss may be configured by an interpolation method utilizing only the previous time point frame and the later time point frame of the specific t time point frame of each of the first image and the second image.

In addition, the recycle loss may be configured by an interpolation method utilizing only the previous time point frame and the later time point frame of the specific t time point frame of each of the first image and the second image.

Furthermore, the adversarial loss may be represented by the following general formula 3.

$$\min_{G_Y} \max_{D_Y} L_g(G_Y, D_Y) = \quad \text{[General Formula 3]}$$
$$\sum_s \log D_Y(y_s) + \sum_t \log(1 - D_Y(G_Y(x_t)))$$

In General Formula 3 above, G is an image generation function, D is an identification function, $y_s$ is a specific s time point frame of the second image, $x_t$ is a specific t time point frame of the first image, and Y is the data of the second image.

Also, the image synthesizing apparatus of the present application comprises an input part for inputting temporal information and spatial information about a first image and a second image different from the first image; and a control part for calculating a recurrent loss ($L_T$) calculated by the following general formula 1 and a recycle loss (Lr) calculated by the following general formula 2 based on the input information, and learning by combining the calculated recurrent loss and recycle loss with an adversarial loss.

$$L_T(P_x) = \Sigma_{T-1} \| 2_{x_t} - P_X(x_{t+1}) - P_X(x_{t-1}) \|^2 \quad \text{[General Formula 1]}$$

$$L_r(G_X, G_Y, P_Y) = \Sigma_{T-1} \| 2_{x_t} - G_X(P_Y(G_Y(x_{t+1}))) - G_X(P_Y(G_Y(x_{t-1}))) \|^2 \quad \text{[General Formula 2]}$$

In General Formulas 1 and 2 above, $x_{t-1}$ is a previous time point frame of a specific t time point frame of the first image, $x_{t+1}$ is a later time point frame of a specific t time point frame of the first image, $x_t$ is a specific t time point frame of the first image, P is a prediction function trained to predict a future model from past frames of an image, G is an image generation function, X is the data of the first image, and Y is the data of the second image.

Also, the image synthesizing apparatus may further comprise an output part.

In addition, the adversarial loss may be represented by the following general formula 3.

$$\min_{G_Y} \max_{D_Y} L_g(G_Y, D_Y) = \quad \text{[General Formula 3]}$$
$$\sum_s \log D_Y(y_s) + \sum_t \log(1 - D_Y(G_Y(x_t)))$$

In General Formula 3 above, G is an image generation function, D is an identification function, $y_s$ is a specific s time point frame of the second image, $x_t$ is a specific t time point frame of the first image, and Y is the data of the second image.

The image synthesizing method of the present application and the image synthesizing apparatus using the same can reduce the time required for learning by reducing the distortion phenomenon of the algorithm and reducing the amount of calculation required for image synthesis. In addition, the image synthesizing method of the present application and the image synthesizing apparatus using the same can be utilized in various fields such as national defense, IT, and entertainment based on characteristics such as excellent performance and learning time reduction of deep learning algorithms, and can be utilized in psychological warfare or induction of command system confusion.

BRIEF DESCRIPTION OF THE SEVERAL VIEWS OF THE DRAWINGS

FIG. 1 is an image illustrating a previous time point frame ($X_{t-1}$) of a specific t time point frame of a first image in order to explain an image synthesis method according to one example of the present application.

FIG. 2 is an image illustrating a later time point frame ($X_{t+1}$) of a specific t time point frame of a first image in order to explain an image synthesis method according to one example of the present application.

FIG. 3 is an image illustrating a synthesized image ($X'_t$) of a first image in order to explain an image synthesizing method according to one example of the present application.

DESCRIPTION OF SPECIFIC EMBODIMENTS OF THE INVENTION

The present application relates to an image synthesis method. For example, by using an interpolation method, the image synthesis method may be a method capable of reducing the time required for learning by reducing an algorithm distortion phenomenon and reducing the amount of calculation required for image synthesis. In addition, the image synthesis method of the present application can be utilized in various fields such as national defense, IT, and entertainment based on the characteristics such as excellent performance and learning time reduction of the deep learning algorithm, and can be utilized in psychological warfare or induction of command system confusion. In this specification, the interpolation method means, when the function value F(x) for two or more variable values is known in a state where specific functions are undetermined, a method of estimating a function value for a specific x value existing between the respective variables.

An exemplary method for synthesizing image of the present application comprises an inputting step and a learning step.

The inputting step is a step of inputting temporal information and spatial information for each image, which is performed by preparing a first image and a second image different from the first image. The temporal information on the images means temporal information at a specific time point. In addition, the spatial information on the images means location and shape information of a certain place or region distributed at a specific time point. Furthermore, the second image means data in which information, such as an object, background or movement, different from the first image is embedded.

FIG. 1 is an image illustrating a previous time point frame ($X_{t-1}$) of a specific t time point frame of a first image in order to explain an image synthesis method according to one example of the present application. As shown in FIG. 1, the first image may be a frame at a time point t−1. Temporal information and spatial information about the frame at a time point t−1 may be obtained through the first image.

FIG. 2 is an image illustrating a later time point frame ($X_{t+1}$) of a specific t time point frame of a first image in order to explain an image synthesis method according to one example of the present application. As shown in FIG. 2, the first image may be a frame at a time point t+1. Temporal information and spatial information about the frame at a time point t+1 may be obtained through the first image.

The learning step is a step which is performed by combining a recurrent loss ($L_T$) and a recycle loss (Lr) with an adversarial loss using an interpolation method, wherein it calculates the recurrent loss calculated by the following general formula 1 and the recycle loss calculated by the following general formula 2, based on the input information, and learns by combining the calculated recurrent loss and recycle loss with the adversarial loss.

$$L_T(P_X) = \Sigma_{T-1} \|2_{x_t} - P_X(x_{t+1}) - P_X(x_{t-1})\|^2 \quad \text{[General Formula 1]}$$

$$L_r(G_X, G_Y, P_Y) = \Sigma_{T-1} \|2_{x_t} - G_X(P_Y(G_Y(x_{t+1}))) - G_X(P_Y(G_Y(x_{t-1})))\|^2 \quad \text{[General Formula 2]}$$

In General Formulas 1 and 2 above, $x_{t-1}$ is a previous time point frame of a specific t time point frame of the first image, $x_{t+1}$ is a later time point frame of a specific t time point frame of the first image, $x_t$ is a specific t time point frame of the first image, P is a prediction function trained to predict a future model from past frames of an image, G is an image generation function, X is the data of the first image, and Y is the data of the second image.

FIG. 3 is an image illustrating a synthesized image ($X'_t$) in order to explain an image synthesizing method according to one example of the present application. As shown in FIG. 3, when the learning step is performed, the time required for learning can be reduced by reducing the distortion phenomenon of the algorithm and reducing the amount of calculation required for image synthesis.

The recurrent loss means an error value generated by the prediction function, which can be configured by an interpolation method using only a previous time point frame and a later time point frame of a specific t time point frame of each of the first image and the second image, specifically, a previous time point frame and a later time point frame of a specific t time point frame of the first image and a previous time point frame and a later time point frame of a specific t time point frame of the second image, that is, two frames of each of the first image and the second image. As the recurrent loss is configured by the interpolation method, the time required for learning can be reduced by reducing the distortion phenomenon of the algorithm and reducing the amount of calculation required for image synthesis, as compared to the extrapolation method.

In addition, the recycle loss means error values of the image generation function and the prediction function such that the first image domain and the second image domain are connected in both directions and displayed continuously with the flow of time, and the generation function returning to the original domain, which can be configured by an interpolation method using only a previous time point frame and a later time point frame of a specific t time point frame of each of the first image and the second image, specifically, a previous time point frame and a later time point frame of a specific t time point frame of the first image and a previous time point frame and a later time point frame of a specific t time point frame of the second image, that is, two frames of each of the first image and the second image. As the recurrent loss is configured by the interpolation method, the time required for learning can be reduced by reducing the distortion phenomenon of the algorithm and reducing the amount of calculation required for image synthesis, as compared to the extrapolation method.

The adversarial loss is a loss that makes the generated frame and the frame of the original image indistinguishable from each other, which can be calculated by the following general formula 3.

$$\min_{G_Y} \max_{D_Y} L_g(G_Y, D_Y) = \qquad \text{[General Formula 3]}$$
$$\sum_s \log D_Y(y_s) + \sum_t \log(1 - D_Y(G_Y(x_t)))$$

In General Formula 3 above, G is an image generation function, D is an identification function, $y_s$ is a specific s time point frame of the second image, $x_t$ is a specific t time point frame of the first image, and Y is the data of the second image.

As the adversarial loss is configured by the interpolation method, the time required for learning can be reduced by reducing the distortion phenomenon of the algorithm and reducing the amount of calculation required for image synthesis, as compared to the extrapolation method.

The present application also relates to an image synthesizing apparatus. The image synthesizing apparatus relates to an image synthesizing apparatus using the above-described image synthesizing method, where the details of the image synthesizing apparatus to be described below will be omitted because the contents described in the image synthesizing method can be equally applied.

The image synthesizing apparatus comprises an input part and a control part.

The input part is a part for inputting temporal information and spatial information about a first image and a second image different from the first image. Since the detailed description of the input part is the same as that described in the input step, it will be omitted.

In addition, the control part is a part for calculating a recurrent loss ($L_T$) calculated by the following general formula 1 and a recycle loss (Lr) calculated by the following general formula 2 based on the input information, and learning by combining the calculated recurrent loss and recycle loss with an adversarial loss.

$$L_T(P_x) = \Sigma_{T-1} \| 2_{x_t} - P_X(x_{t+1}) - P_X(x_{t-1}) \|^2 \qquad \text{[General Formula 1]}$$

$$L_r(G_X, G_Y, P_Y) = \Sigma_{T-1} \| 2_{x_t} - G_X(P_Y(G_Y(x_{t+1}))) - G_X(P_Y(G_Y(x_{t-1}))) \|^2 \qquad \text{[General Formula 2]}$$

In General Formulas 1 and 2 above, $x_{t-1}$ is a previous time point frame of a specific t time point frame of the first image, $x_{t+1}$ is a later time point frame of a specific t time point frame of the first image, $x_t$ is a specific t time point frame of the first image, P is a prediction function trained to predict a future model from past frames of an image, G is an image generation function, X is the data of the first image, and Y is the data of the second image.

Since the detailed description of the control part is the same as that described in the learning step, it will be omitted.

The image synthesizing apparatus may further comprise an output part. The output part is a part for outputting the image combined, i.e., learned and synthesized through the control part to a display device. The image synthesizing apparatus may further comprise an output part, thereby visualizing the image in which the first image and the second image are synthesized. As the type of the display device, any type known in the art may be used, so that it is not particularly limited. For example, a liquid crystal display (LCD), a light emitting diode (LED) and an organic light emitting diode (OLED), and the like may be used as the display device.

The adversarial loss is a loss that makes the generated frame and the frame of the original image indistinguishable from each other, which can be calculated by the following general formula 3.

$$\min_{G_Y} \max_{D_Y} L_g(G_Y, D_Y) = \qquad \text{[General Formula 3]}$$
$$\sum_s \log D_Y(y_s) + \sum_t \log(1 - D_Y(G_Y(x_t)))$$

In General Formula 3 above, G is an image generation function, D is an identification function, $y_s$ is a specific s time point frame of the second image, $x_t$ is a specific t time point frame of the first image, and Y is the data of the second image.

Since the detailed description of the adversarial loss is the same as that described in the image synthesis method, it will be omitted.

What is claimed is:

1. A method for synthesizing image comprising:
   a step of preparing a first image and a second image different from the first image, and inputting temporal information and spatial information for each image; and
   a step of calculating a recurrent loss ($L_T$) calculated by the following general formula 1 and a recycle loss (Lr) calculated by the following general formula 2 based on the input information, and learning by combining the calculated recurrent loss and recycle loss with an adversarial loss:

$$L_T(P_x) = \Sigma_{T-1} \| 2_{x_t} - P_X(x_{t+1}) - P_X(x_{t-1}) \|^2 \qquad \text{[General Formula 1]}$$

$$L_r(G_X, G_Y, P_Y) = \Sigma_{T-1} \| 2_{x_t} - G_X(P_Y(G_Y(x_{t+1}))) - G_X(P_Y(G_Y(x_{t-1}))) \|^2 \qquad \text{[General Formula 2]}$$

wherein, $x_{t-1}$ is a previous time point frame of a specific t time point frame of the first image, $x_{t+1}$ is a later time point frame of a specific t time point frame of the first image, $x_t$ is a specific t time point frame of the first image, P is a prediction function trained to predict a future model from past frames of an image, G is an image generation function, X is the data of the first image, and Y is the data of the second image.

2. The method for synthesizing image according to claim 1, wherein the recurrent loss is configured by an interpolation method using only a previous time point frame and a later time point frame of a specific t time point frame of each of the first image and the second image.

3. The method for synthesizing image according to claim 1, wherein the recycle loss is configured by an interpolation method using only a previous time point frame and a later time point frame of a specific t time point frame of each of the first image and the second image.

4. The method for synthesizing image according to claim 1, wherein the adversarial loss is calculated by the following general formula 3:

$$\min_{G_Y} \max_{D_Y} L_g(G_Y, D_Y) = \qquad \text{[General Formula 3]}$$
$$\sum_s \log D_Y(y_s) + \sum_t \log(1 - D_Y(G_Y(x_t)))$$

wherein, G is an image generation function, D is an identification function, $y_s$ is a specific s time point frame of the second image, $x_t$ is a specific t time point frame of the first image, and Y is the data of the second image.

5. An image synthesizing apparatus comprising:
   an input part for inputting temporal information and spatial information about a first image and a second image different from the first image; and a control part for calculating a recurrent loss ($L_T$) calculated by the following general formula 1 and a recycle loss (Lr) calculated by the following general formula 2 based on the input information, and learning by combining the calculated recurrent loss and recycle loss with an adversarial loss:

$$L_T(P_x) = \Sigma_{T-1} \| 2_{x_t} - P_X(x_{t+1}) - P_X(x_{t-1}) \|^2 \quad \text{[General Formula 1]}$$

$$L_r(G_X, G_Y, P_Y) = \Sigma_{T-1} \| 2_{x_t} - G_X(P_Y(G_Y(x_{t+1}))) - G_X(P_Y(G_Y(x_{t-1}))) \|^2 \quad \text{[General Formula 2]}$$

wherein, $x_{t-1}$ is a previous time point frame of a specific t time point frame of the first image, $x_{t+1}$ is a later time point frame of a specific t time point frame of the first image, $x_t$ is a specific t time point frame of the first image, P is a prediction function trained to predict a future model from past frames of an image, G is an image generation function, X is the data of the first image, and Y is the data of the second image.

6. The image synthesizing apparatus according to claim 5, further comprising an output part.

7. The image synthesizing apparatus according to claim 5, wherein the adversarial loss is calculated by the following general formula 3:

$$\min_{G_Y} \max_{D_Y} L_g(G_Y, D_Y) = \quad \text{[General Formula 3]}$$
$$\sum_s \log D_Y(y_s) + \sum_t \log(1 - D_Y(G_Y(x_t)))$$

wherein, G is an image generation function, D is an identification function, $y_s$ is a specific s time point frame of the second image, $x_t$ is a specific t time point frame of the first image, and Y is the data of the second image.

* * * * *